US012110658B2

(12) United States Patent
Jeon

(10) Patent No.: US 12,110,658 B2
(45) Date of Patent: Oct. 8, 2024

(54) CONSTRUCTION MACHINERY

(71) Applicant: HD HYUNDAI INFRACORE CO., LTD., Incheon (KR)

(72) Inventor: Hyeonggguk Jeon, Goyang-si (KR)

(73) Assignee: HD HYUNDAI INFRACORE CO., LTD., Incheon (KR)

(*) Notice: Subject to any disclaimer, the term of this patent is extended or adjusted under 35 U.S.C. 154(b) by 0 days.

(21) Appl. No.: 18/213,463

(22) Filed: Jun. 23, 2023

(65) Prior Publication Data

US 2023/0332378 A1 Oct. 19, 2023

Related U.S. Application Data

(63) Continuation of application No. PCT/KR2021/018936, filed on Dec. 14, 2021.

(30) Foreign Application Priority Data

Dec. 24, 2020 (KR) ........................ 10-2020-0183030

(51) Int. Cl.
*E02F 9/12* (2006.01)
*E02F 9/22* (2006.01)
*F15B 21/14* (2006.01)

(52) U.S. Cl.
CPC ............ *E02F 9/123* (2013.01); *E02F 9/2217* (2013.01); *E02F 9/2221* (2013.01);
(Continued)

(58) Field of Classification Search
CPC . F15B 11/0423; F15B 11/044; F15B 11/0445; F15B 21/14; F15B 2211/7058;
(Continued)

(56) References Cited

U.S. PATENT DOCUMENTS 9,388,828 B2 * 7/2016 Hillman .................. F15B 1/024
10,000,906 B2 * 6/2018 Wu ....................... E02F 9/2267
(Continued)

FOREIGN PATENT DOCUMENTS

KR 10-2012-0040684 A 4/2012
KR 10-2015-0082297 A 7/2015
(Continued)

OTHER PUBLICATIONS

International Search Report dated Apr. 4, 2022 for corresponding International Patent Application No. PCT/KR2021/018936, 5 pages.
(Continued)

*Primary Examiner* — Michael Leslie
(74) *Attorney, Agent, or Firm* — Hauptman Ham, LLP

(57) ABSTRACT

An embodiment of the present invention relates to construction machinery comprising: a first hydraulic pressure line which is connected to a main control valve and one side of a swing motor; a first valve arranged on the first hydraulic pressure line; a first pressure detection member which detects the pressure of the hydraulic oil passing through the first hydraulic pressure line between the first valve and the main control valve; a fourth pressure detection member which detects the pressure of the hydraulic oil passing through the first hydraulic pressure line between the swing motor and the first valve; and a control unit which calculates the flow rate of the hydraulic oil discharged from the swing motor on the basis of the pressure of the hydraulic oil detected by the first pressure detection member and the pressure of the hydraulic oil detected by the fourth pressure detection member.

9 Claims, 4 Drawing Sheets

101

(52) U.S. Cl.
CPC .......... *E02F 9/2235* (2013.01); *E02F 9/2296* (2013.01); *F15B 21/14* (2013.01)

(58) Field of Classification Search
CPC ..... E02F 9/2221; E02F 9/2228; E02F 9/2235; E02F 9/2217
See application file for complete search history.

(56) References Cited

U.S. PATENT DOCUMENTS

| | | | | |
|---|---|---|---|---|
| 10,150,657 | B2 * | 12/2018 | Miyoshi | B66C 13/20 |
| 10,233,613 | B2 * | 3/2019 | Honda | E02F 9/2217 |
| 10,988,915 | B2 * | 4/2021 | Kang | F15B 1/02 |
| 2012/0067432 | A1 | 3/2012 | Vigholm et al. | |
| 2014/0060022 | A1 | 3/2014 | Hillman et al. | |
| 2015/0240450 | A1 | 8/2015 | Wu | |
| 2020/0123737 | A1 | 4/2020 | Kang | |
| 2023/0228061 | A1 * | 7/2023 | Kang | E02F 9/2217 60/413 |

FOREIGN PATENT DOCUMENTS

| | | | |
|---|---|---|---|
| KR | 10-2019-0122868 | A | 10/2019 |
| KR | 10-2019-0124289 | A | 11/2019 |

OTHER PUBLICATIONS

Written Opinion dated Apr. 4, 2022 for corresponding International Patent Application No. PCT/KR2021/018936, 5 pages.

* cited by examiner

CONSTRUCTION MACHINERY

CROSS-REFERENCE TO RELATED APPLICATION

The present application is a Continuation of International Patent Application No. PCT/KR2021/018936, filed on Dec. 14, 2021, which is based upon and claims the benefit of priority to Korean Patent Application No. 10-2020-0183030, filed on Dec. 24, 2020. The disclosures of the above-listed applications are hereby incorporated by reference herein in their entirety.

TECHNICAL FIELD

Embodiments of the present disclosure relate to construction machinery, and more particularly, to construction machinery capable of estimating a rotational direction of a swing motor and an amount of rotation thereof without a separate sensor.

BACKGROUND ART

In general, construction machinery uses pressure generated in a hydraulic oil by operation of a main pump and transferred to a working machine as a power source. The main pump is operated by rotation of an engine. The working machine includes a boom, an arm, a cylinder for driving the arm, and a swing motor for a swing operation of a swing body of the construction machinery.

In general, by receiving the hydraulic oil, the swing motor rotates the swing body in either the right or left direction.

In order to detect the rotational direction of the swing body, a separate swing encoder is provided so as to detect the actual rotational direction of the swing body.

In addition, a separate inertial measurement sensor is provided to detect the rotational speed of the swing body, in other words, the rotational speed of the swing motor, and the rotational speed of the swing motor is utilized in recovery or regeneration of the hydraulic oil in a hydraulic pressure line according to the speed or the acceleration and deceleration thereof.

However, the above-mentioned swing encoder or inertial measurement sensor has problems by durability, in addition to vulnerability to contamination due to the working environment of construction machinery. In addition, there is a problem concerning time and cost incurred by replacement of the swing encoder or inertial measurement sensor. Moreover, since the inertial measurement sensor is expensive, there is a problem in that the cost increases when construction machinery is manufactured by installing the inertial measurement sensor.

DISCLOSURE OF THE INVENTION

Technical Goals

Embodiments of the present disclosure provide construction machinery capable of estimating a rotational direction of a swing motor and an amount of rotation thereof on the basis of pressure.

Technical Solutions

According to an embodiment of the present disclosure, construction machinery includes a main control valve which receives and transfers a hydraulic oil, a swing motor which is operated by the hydraulic oil transferred from the main control valve, a first hydraulic pressure line connected to the main control valve and one side of the swing motor, a first valve arranged on the first hydraulic pressure line, a first pressure detection member which detects pressure of the hydraulic oil passing through the first hydraulic pressure line between the first valve and the main control valve, a fourth pressure detection member which detects pressure of the hydraulic oil passing through the first hydraulic pressure line between the swing motor and the first valve, and a controller which calculates a flow rate of the hydraulic oil discharged from the swing motor based on the pressure of the hydraulic oil detected by the first pressure detection member and the pressure of the hydraulic oil detected by the fourth pressure detection member.

Further, the controller may estimate a rotational speed of the swing motor through the calculated flow rate of the hydraulic oil.

Alternatively, the first valve may selectively guide movement of the hydraulic oil between the swing motor and the main control valve, and the controller may calculate the flow rate of the hydraulic oil based on the pressure of the hydraulic oil detected by the first pressure detection member and the pressure of the hydraulic oil detected by the fourth pressure detection member.

Alternatively, the first valve may selectively guide movement of the hydraulic oil between the swing motor and the main control valve, and the controller may calculate the flow rate of the hydraulic oil when the hydraulic oil discharged from the swing motor is guided to detour the main control valve as the first valve is switched.

Further, the controller may calculate the flow rate of the hydraulic oil based on a spool area of the first valve and a difference between the pressure of the hydraulic oil detected by the first pressure detection member and the pressure of the hydraulic oil detected by the fourth pressure detection member.

Further, the controller may determine that the swing motor rotates in one direction when the pressure of the hydraulic oil detected by the first pressure detection member is greater than a predetermined rotational pressure.

Further, the construction machinery may further include a second hydraulic pressure line connected to the main control valve and the other side of the swing motor, a second pressure detection member which is arranged on the second hydraulic pressure line and detects pressure of the hydraulic oil passing through the second hydraulic pressure line, a second valve arranged on the second hydraulic pressure line between the second pressure detection member and the swing motor, and a third hydraulic pressure line which is connected to the first valve and the second valve and allows the hydraulic oil passing through the first hydraulic pressure line or the second hydraulic pressure line to detour.

Further, the construction machinery may further include a third pressure detection member which is arranged on the second hydraulic pressure line between the second valve and the swing motor and detects pressure of the hydraulic oil flowing into the second valve to transfer it to the controller.

Alternatively, construction machinery according to another embodiment of the present disclosure may include a main control valve which receives and transfers a hydraulic oil, a swing motor operated by the hydraulic oil transferred from the main control valve, a first hydraulic pressure line connected to the main control valve and one side of the swing motor, a second hydraulic pressure line connected to the main control valve and the other side of the swing motor, a first pressure detection member which is arranged on the first hydraulic pressure line and detects pressure of the hydraulic oil passing through the first hydraulic pressure line, a first valve which is arranged on the first hydraulic pressure line between the first pressure detection member and the swing motor and is switchable to allow the hydraulic oil passing through the first hydraulic pressure line to detour, a second pressure detection member which is arranged on the second hydraulic pressure line and detects pressure of the hydraulic oil passing through the second hydraulic pressure line, a second valve which is arranged on the second hydraulic pressure line between the second pressure detection member and the swing motor and is switchable to allow the hydraulic oil passing through the first hydraulic pressure line to detour, a third hydraulic pressure line which is connected to the first valve and the second valve and allows the hydraulic oil passing through the first hydraulic pressure line or the second hydraulic pressure line to detour, a third pressure detection member which is arranged between the second valve and the swing motor and detects pressure of the hydraulic oil flowing into the second valve, a fourth pressure detection member which is arranged between the first valve and the swing motor and detects pressure of the hydraulic oil flowing into the first valve, and a controller which calculates a flow rate discharged from the swing motor based on the pressure of the hydraulic oil discharged from the swing motor and flowing into the first valve or the second valve and pressure of the hydraulic oil discharged from the first valve or the second valve, based on information on the pressure of the hydraulic oil detected by the first pressure detection member and the pressure of the hydraulic oil detected by the second pressure detection member.

Advantageous Effects

According to an embodiment of the present disclosure, construction machinery may estimate a rotational direction and an amount of rotation of a swing motor on the basis of pressure flowing into the swing motor and pressure discharged from the swing motor.

BEST MODE FOR CARRYING OUT THE INVENTION

Figure 1:
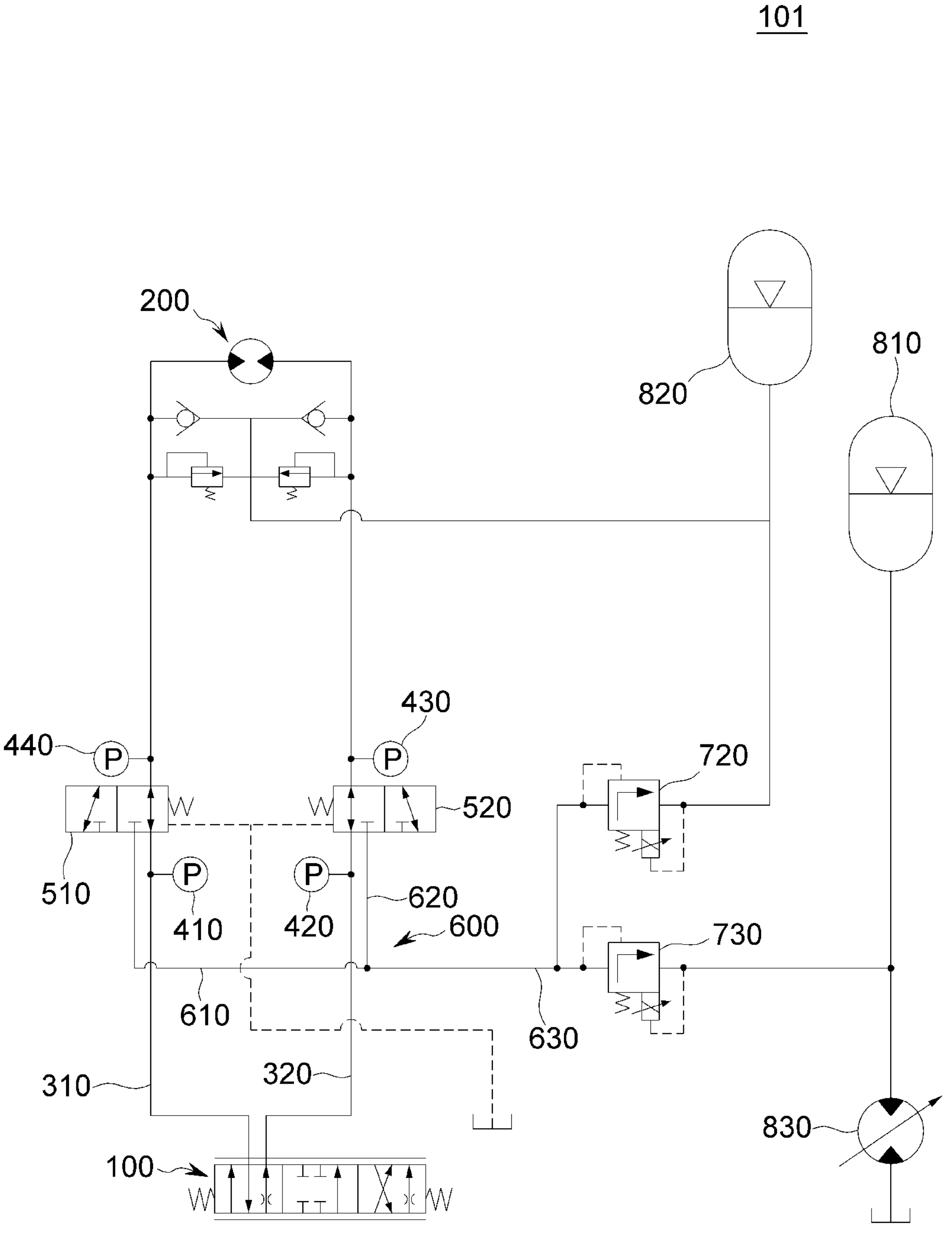
FIG. 1 illustrates construction machinery according to an embodiment of the present disclosure.

Hereinafter, with reference to the accompanying drawings, embodiments of the present disclosure will be described in detail such that those skilled in the art to which the present disclosure pertains can easily make them. The present disclosure may be implemented in various different forms and is not limited to embodiments described herein.

It should be understood that the drawings are schematic and not drawn to scale. The relative dimensions and proportions of the portions in the drawings have been shown in exaggerated or reduced size for clarity and convenience in the drawings, and any dimension is merely illustrative, but not limiting. In addition, for the same structural elements or components shown in two or more drawings, the same reference numerals are used to represent similar features.

An embodiment of the present disclosure shows an ideal embodiment of the present disclosure in detail. As a result, it is expected to have various variations in the illustration. Therefore, the embodiment is not limited to a specific form of the illustrated area and includes, for example, modification in the form by manufacturing.

Hereinafter, referring to FIGS. 1 and 2, construction machinery 101 according to an embodiment of the present disclosure is described.

Figure 2:
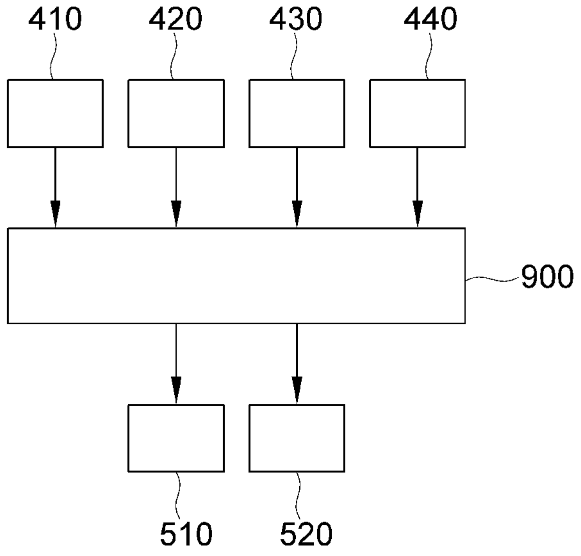
FIG. 2 illustrates a controller in FIG. 1.

The construction machinery 101 according to an embodiment of the present disclosure, as shown in FIGS. 1 and 2, includes a main control valve 100, a swing motor 200, a first hydraulic pressure line 310, a second hydraulic pressure line 320, a first pressure detection member 410, a second pressure detection member 420, and a controller 900.

The main control valve 100 receives and transfers a hydraulic oil. Specifically, the main control valve 100 receives the hydraulic oil in which hydraulic pressure is formed by operation of a main pump that is not shown. The hydraulic oil in which such hydraulic pressure is formed generates energy for operation of the construction machinery 101.

The swing motor 200 is operated by the hydraulic oil received from the main control valve 100. Specifically, the swing motor 200 may be rotated in one direction or the other direction by the hydraulic oil transferred by the main control valve 100. In other words, the swing motor 200 provides power so that a swing body located above a driving body of the construction machinery 101 is rotated. In other words, the main control valve 100 may be a swing valve to control the swing motor 200.

The first hydraulic pressure line 310 is connected to the main control valve 100 and one side of the swing motor 200. In addition, the first hydraulic pressure line 310 guides movement of the hydraulic oil between the main control valve 100 and the swing motor 200. In other words, the first hydraulic pressure line 310 may transfer the hydraulic oil passing through the main control valve 100 to the swing motor 200 or guide the hydraulic oil passing through the swing motor 200 to be discharged.

The second hydraulic pressure line 320 is connected to the main control valve 100 and the other side of the swing motor 200. In addition, the second hydraulic pressure line 320 guides movement of the hydraulic oil between the main control valve 100 and the swing motor 200. In other words, the second hydraulic pressure line 320 may transfer the hydraulic oil passing through the main control valve 100 to the swing motor 200 or guide the hydraulic oil passing through the swing motor 200 to be discharged.

The first pressure detection member 410 is arranged on the first hydraulic pressure line 310 to detect the pressure of the hydraulic oil passing through the first hydraulic pressure line 310. Specifically, the first pressure detection member 410 may detect the pressure of the hydraulic oil supplied to the swing motor 200 through the first hydraulic pressure line 310 or the pressure of the hydraulic oil discharged from the swing motor 200 through the first hydraulic pressure line 310.

The second pressure detection member 420 is arranged on the second hydraulic pressure line 320 to detect the pressure of the hydraulic oil passing through the second hydraulic pressure line 320. Specifically, the second pressure detection member 420 may detect the pressure of the hydraulic oil supplied to the swing motor 200 through the second hydraulic pressure line 420 or the pressure of the hydraulic oil discharged from the swing motor 200 through the second hydraulic pressure line 320.

The controller 900 determines a rotational direction of the swing motor 200. In addition, the controller 900 receives the pressure of the hydraulic oil detected by the first pressure detection member 410 and the pressure of the hydraulic oil detected by the second pressure detection member 420. In addition, the controller 900 determines the rotational direction of the swing motor 200 on the basis of information on the pressure of the hydraulic oil detected by the first pressure detection member 410 and the pressure of the hydraulic oil detected by the second pressure detection member 420.

Specifically, a predetermined rotational pressure is stored in the controller 900. The predetermined rotational pressure may be the pressure of the hydraulic oil passing through the main control valve 100 that causes rotation in one direction or the other direction of the swing motor 200.

The controller 900 determines whether the pressure of the hydraulic oil detected by the first pressure detection member 410 is greater than the predetermined rotational pressure. For example, the predetermined rotational pressure may be 30 bar.

In addition, the controller 900 determines whether the pressure of the hydraulic oil detected by the first pressure detection member 410 is greater than the pressure of the hydraulic oil detected by the second pressure detection member 420.

In addition, the controller 900 determines that the swing motor 200 rotates in one direction when the pressure of the hydraulic oil detected by the first pressure detection member 410 is greater than the predetermined rotational pressure, and the pressure of the hydraulic oil detected by the first pressure detection member 410 is greater than the pressure of the hydraulic oil detected by the second pressure detection member 420.

In this case, the hydraulic oil supplied to the swing motor 200 by passing through the first hydraulic pressure line 310 may provide power to allow the swing motor 200 to operate in one direction and be discharged from the swing motor 200 through the second hydraulic pressure line 320.

Alternatively, the controller 900 determines that the swing motor 200 rotates in the other direction when the pressure of the hydraulic oil detected by the second pressure detection member 420 is greater than the predetermined rotational pressure and the pressure of the hydraulic oil detected by the second pressure detection member 420 is greater than the pressure of the hydraulic oil detected by the first pressure detection member 410.

In this case, the hydraulic oil supplied to the swing motor 200 by passing through the second hydraulic pressure line 320 may provide power to allow the swing motor 200 to operate in the other direction and be discharged from the swing motor 200 through the first hydraulic pressure line 310.

Accordingly, the controller 900 according to an embodiment of the present disclosure may determine the rotational direction of the swing motor 200 based on the pressure information of the hydraulic oil detected by the first pressure detection member 410 and the second pressure detection member 420, respectively. In other words, the construction machinery 101 according to an embodiment of the present disclosure may effectively determine the rotational direction of the swing motor 200 that is actually driven without a sensor for detecting the rotational direction of the separate swing motor 200.

In addition, the construction machinery 101 according to an embodiment of the present disclosure may further include a first valve 510, a second valve 520, and a third hydraulic pressure line 600.

The first valve 510 may be arranged on the first hydraulic pressure line 310. In addition, the first valve 510 may be arranged between the first pressure detection member 410 and the swing motor 200. In addition, the first valve 510 may guide the movement of the hydraulic oil between the main control valve 100 and the swing motor 200 or control the hydraulic oil passing through the first hydraulic pressure line 310 to detour.

In addition, the first valve 510 may allow the hydraulic oil passing through the main control valve 100 to move in a direction of the swing motor 200, or the first valve 510 may allow the hydraulic oil passing through the swing motor 200 to pass through the main control valve 100. In addition, the first valve 510 may allow the hydraulic oil passing through the swing motor 200 to detour the first hydraulic pressure line 310.

For instance, the first valve 510 may be selectively switched by the controller 900 according to an amount of rotation of the swing motor 200. In this case, the amount of rotation of the swing motor 200 may be the speed (RPM) of the swing motor 200.

The second valve 520 may be arranged on the second hydraulic pressure line 320. In addition, the second valve 520 may be arranged between the second pressure detection member 420 and the swing motor 200. In addition, the second valve 520 may guide the movement of the hydraulic oil between the swing motor 200 and the main control valve 100 or control the hydraulic oil passing through the second hydraulic pressure line 320 to detour.

Specifically, the second valve 520 may allow the hydraulic oil passing through the main control valve 100 to move in the direction of the swing motor 200, or the second valve 520 may allow the hydraulic oil passing through the swing motor 200 to pass through the main control valve 200. In addition, the second valve 520 may allow the hydraulic oil passing through the swing motor 200 to move to detour the second hydraulic pressure line 320.

For example, the second valve 520 may be switched by the controller 900 according to the amount of rotation of the swing motor 200.

Specifically, when the first valve 510 is not switched, the hydraulic oil supplied through the main control valve 100 may be supplied to the swing motor 200. In other words, the hydraulic oil between the main control valve 100 and the swing motor 200 may be guided to move between the main control valve 100 and the swing motor 200 through the first hydraulic pressure line 310.

Alternatively, when the second valve 520 is not switched, it may be supplied to the swing motor 200 supplied through the main control valve 100. In other words, the hydraulic oil between the main control valve 100 and the swing motor 200 may be guided to move between the main control valve 100 and the swing motor 200 through the second hydraulic pressure line 320.

The third hydraulic pressure line 600 may be connected to the first valve 510 and the second valve 520 and guide the hydraulic oil passing through the first hydraulic pressure line 310 or the second hydraulic pressure line 320 to be moved by detouring the first hydraulic pressure line 310 or the second hydraulic pressure line 320.

Specifically, the third hydraulic pressure line 600 may include a first detour line 610, a second detour line 620, and a converging line 630.

The first detour line 610 may guide the hydraulic oil passing through the first valve 510 to detour the first hydraulic pressure line 310 between the first valve 510 and the main control valve 100. Specifically, one side of the first detour line 610 may be connected to the first valve 510. In other words, one side of the first detour line 610 may be spaced apart on the first detour line 610 and the first valve 510.

The second detour line 620 may guide the hydraulic oil passing through the second valve 520 to detour the second hydraulic pressure line 320 between the second valve 520 and the main control valve 100. Specifically, one side of the second detour line 620 may be connected to the second valve 520. In other words, one side of the second detour line 620 may be spaced apart on the second detour line 620 and the second valve 520.

The converging line 630 may guide the hydraulic oil passing through the first detour line 610 or the hydraulic oil passing through the second detour line 620 to be moved. Specifically, the converging line 630 may be connected to the other side of the first detour line 610 and the other side of the second detour line 620 to guide the hydraulic oil detouring the first hydraulic pressure line 310 or the second hydraulic pressure line 320 to be moved along the converging line 630.

In addition, the construction machinery 101 according to an embodiment of the present disclosure may further include a third pressure detection member 430.

The third pressure detection member 430 may be arranged on the second hydraulic pressure line 320 between the second valve 520 and the swing motor 200. In addition, the third pressure detection member 430 may detect the pressure of the hydraulic oil passing through the second hydraulic pressure line 320 between the second valve 520 and the swing motor 200. In addition, the third pressure detection member 430 may detect the pressure of the hydraulic oil flowing into the second valve 520.

In addition, the controller 900 of the construction machinery 101 according to an embodiment of the present disclosure may estimate the amount of rotation of the swing motor 200 on the basis of the pressure detected by the second pressure detection member 420 and the pressure of the hydraulic oil detected by the third pressure detection member 430. In other words, the controller 900 may estimate the rotational speed of the swing motor 200 based on the above-described operating pressure.

When it is determined that the swing motor 200 rotates in one direction, the controller 900 may receive the pressure of the hydraulic oil detected by the second pressure detection member 420 and the pressure of the hydraulic oil detected by the third pressure detection member 430 to calculate a flow rate of the hydraulic oil.

Specifically, Equation 1 by which the flow rate of the hydraulic oil can be calculated on the basis of pressure information is stored in the controller 900 in advance.

$$Q = C_d \cdot A \cdot \sqrt{\frac{2 \cdot \Delta P}{\rho}} \qquad \text{[Equation 1]}$$

Here, Q represents the flow rate of the hydraulic oil, $C_d$ is a coefficient of flow rate, ΔP represents a difference in pressure before and after a valve, p represents the density of the hydraulic oil, and A represents a spool area of the valve. Specifically, A may be the spool area of each of the first valve and the second valve. In other words, A may be a predetermined spool area of the first valve and the second valve.

$C_d$ is the coefficient of flow rate, p is the density of the hydraulic oil, and A is a fixed constant value.

When it is determined that the swing motor 200 rotates in one direction, ΔP may be a difference between the pressure of the hydraulic oil detected by the third pressure detection member 430 and the pressure of the hydraulic oil detected by the second pressure detection member 420.

In other words, the flow rate Q is the flow rate of the hydraulic oil passing through the spool of the first valve 510 or the second valve 520.

Based on Equation 1, the controller 900 calculates the flow rate of the hydraulic oil by detecting the pressure of the hydraulic oil flowing into the second valve 520 and the pressure of the hydraulic oil on the second hydraulic pressure line 320 between the second valve 520 and the main control valve 100. In this case, the controller 900 may estimate the amount of rotation of the swing motor 200 on the basis of the calculated flow rate.

Specifically, since the volume of the swing motor 200 is a fixed value, the controller 900 may estimate the amount of swing rotation of the swing motor 200 on the basis of the calculated flow rate.

In addition, the controller 900 may selectively switch the first valve 510 and the second valve 520 according to the amount of swing rotation of the swing motor 200.

The controller 900 may switch the second valve 520 to guide the hydraulic oil discharged from the swing motor 200 to be moved by detouring the second hydraulic pressure line 320 through the third hydraulic pressure line 600.

Alternatively, the controller 900 may switch the first valve 510 to guide the hydraulic oil discharged from the swing motor 200 to be moved by detouring the first hydraulic pressure line 310 through the third hydraulic pressure line 600.

Thus, the construction machinery 101 according to an embodiment of the present disclosure may estimate the speed which is the amount of swing rotation of the swing motor 200, on the basis of the flow rate of the hydraulic oil discharged from the swing motor 200 without a separate sensor.

In addition, the controller 900 may calculate the flow rate of the hydraulic oil based on Equation 1 with the amount of swing rotation of the swing motor 200 to control a switching state of the first valve 510 or the second valve 520.

In the controller 900, when it is determined that the swing motor 200 rotates in one direction, the first valve 510 may allow the hydraulic oil passing through the main control valve 100 to move in the direction of the swing motor 200.

Alternatively, in the controller 900, when it is determined that the swing motor 200 rotates in the other direction, the second valve 520 may allow the hydraulic oil passing through the main control valve 100 to move in the direction of the swing motor 200, and the first valve 510 may allow the hydraulic oil discharged from the swing motor 200 to detour the first hydraulic pressure line 310 to be moved through the first detour line 610.

In addition, the construction machinery 101 according to an embodiment of the present disclosure may further include a fourth pressure detection member 440.

The fourth pressure detection member 440 may be arranged between the first valve 510 and the swing motor 200. In addition, the fourth pressure detection member 440 may be arranged on the first hydraulic pressure line 310 and detect the pressure of the hydraulic oil flowing into the first valve 510 to transfer it to the controller 900.

When it is determined that the swing motor 200 rotates in the other direction, the controller 900 may calculate ΔP in Equation 1 described above as a difference between the pressure of the hydraulic oil detected by the fourth pressure detection member 440 and the pressure of the hydraulic oil detected by the first pressure detection member 410. In addition, when it is determined that the swing motor 200 rotates in the other direction, the controller 900 may estimate the amount of rotation of the swing motor 200 by calculating the flow rate of the hydraulic oil on the basis of Equation 1 described above based on the difference between the pressure of the hydraulic oil detected by the fourth pressure detection member 440 and the pressure of the hydraulic oil detected by the first pressure detection member 410.

The controller 900 may determine whether to calculate the flow rate based on the difference in the pressure between the first pressure detection member 410 and the fourth pressure detection member 440 or whether to calculate the flow rate based on the difference in the pressure between the pressure of the second pressure detection member 420 and the third pressure detection member 430.

In this case, the controller 900 may determine whether to calculate the flow rate based on which pressure detection member on the basis of pressure signals of the first pressure detection member 410 and the second pressure detection member 420.

In addition, the construction machinery 101 according to an embodiment of the present disclosure may further include a first accumulator 810, a regenerative motor 830, and a first pressure control valve 730.

The first accumulator 810 may be connected to the converging line 630 in the third hydraulic pressure line 600. In addition, the first accumulator 810 may store the hydraulic oil passing through the converging line 630.

The regenerative motor 830 may assist the torque of an engine that operates the main pump. Specifically, the regenerative motor 830 may assist the torque of the engine using the hydraulic oil stored in the first accumulator 810.

The first pressure control valve 730 may be installed on the converging line 630 to control the opening and closing of the converging line 630 such that the hydraulic oil is stored in the first accumulator 810.

In addition, the construction machinery 101 according to an embodiment of the present disclosure may further include a second accumulator 820 and a second pressure control valve 720.

The second accumulator 820 may store the hydraulic oil discharged from the swing motor 200 or supply the hydraulic oil to the swing motor 200 according to the amount of rotation of the swing motor 200.

The second pressure control valve 720 may open and close the inflow of hydraulic oil supplied to the second accumulator 820.

Hereinafter, referring to FIGS. 1 to 4, an operation process of the construction machinery 101 according to an embodiment of the present disclosure is described.

As shown in FIGS. 1 and 2, when an operator determines that a swing operation of the construction machinery 101 is required, a joystick is manipulated to allow the swing body of the construction machinery 101 to be rotated. At this time, according to manipulation information of the joystick, the main control valve 100 is switched.

Figure 3:
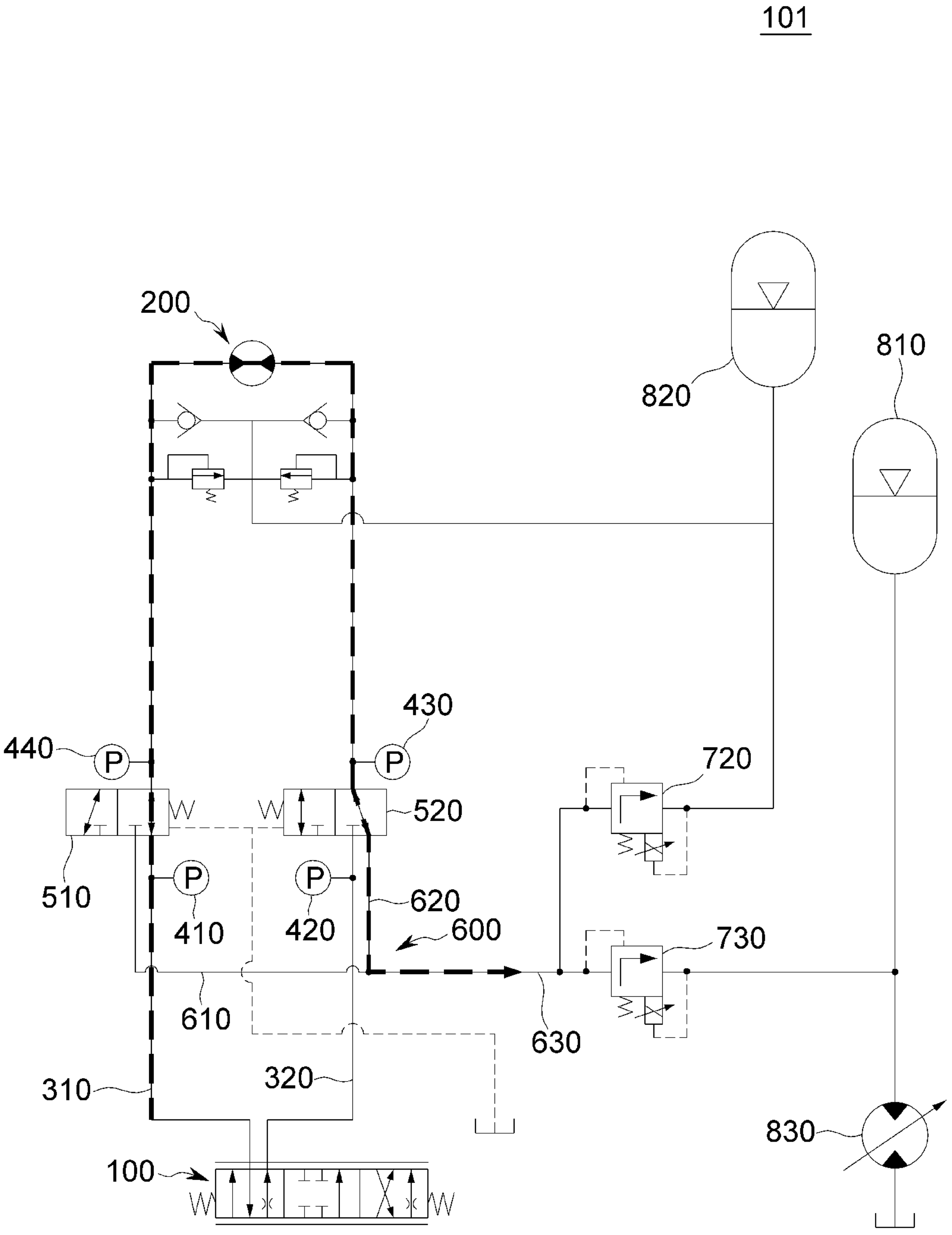
FIGS. 3 and 4 illustrate a rotational operation of a swing motor of construction machinery according to an embodiment of the present disclosure.

As an example, as shown in FIG. 3, a case in which the main control valve 100 is switched to allow the swing motor 200 to be rotated in one direction (right turn) according to the manipulation information of the joystick.

Hydraulic oil in which the pressure is generated from the main pump not shown is supplied to the first hydraulic pressure line 310 through a switching area of the main control valve 100.

In addition, the hydraulic oil passes through the first valve 510 to be supplied to the swing motor 200. Such hydraulic oil is used for rotation of the swing motor 200, and the swing body is rotated according to the rotation of the swing motor 200.

The hydraulic oil discharged from the swing motor 200 is moved along the second hydraulic pressure line 320.

Further, the hydraulic oil passes through the second valve 520 and flows back into the main control valve 100. Accordingly, the hydraulic oil that has passed through the main control valve 100 again may be discharged back into a tank not shown.

In this case, the controller 900 receives information detected by the first pressure detection member 410, the second pressure detection member 420, the third pressure detection member 430, and the fourth pressure detection member 440.

The controller 900 determines whether the pressure detected by the first pressure detection member 410 is greater than or equal to 30 bar, which is the predetermined rotational pressure. In other words, the first pressure detection member 410 detects the pressure of the hydraulic oil discharged from the main control valve 100 supplied to the swing motor 200 to transfer it to the controller 900.

In addition, the controller 900 compares the pressure of the hydraulic oil detected by the second pressure detection member 420 with the pressure of the hydraulic oil detected by the first pressure detection member 410. In other words, the second pressure detection member 420 detects the pressure of the hydraulic oil discharged from the swing motor 200 and flowing back into the main control valve 100 to transfer it to the controller 900.

Specifically, the controller 900 determines that the swing motor 200 rotates in one direction when the pressure detected by the first pressure detection member 410 is greater than or equal to 30 bar, and the pressure of the hydraulic oil supplied to the swing motor 200 from the main control valve 100 detected by the first pressure detection member 410 is greater than the pressure of the hydraulic oil discharged from the swing motor 200 detected by the second pressure detection member 420 and flowing into the main control valve 100.

Since the hydraulic oil flowing into the swing motor 200 from the main control valve 100 has higher pressure than the hydraulic oil discharged from the swing motor 200, the controller 900 determines that the rotation is performed in one direction of the swing motor 200 when the pressure of the hydraulic oil detected by the first pressure detection member 410 is higher than that of the second pressure detection member 420 and the pressure detected by the first pressure detection member is greater than or equal to 30 bar.

In other words, the controller 900 may determine the actual rotational direction of the swing motor 200 based on the pressure of the hydraulic oil supplied from the main control valve 100 to the swing motor 200 detected by the first pressure detection member 410 and the pressure of the hydraulic oil discharged from the swing motor 200 and flowing into the main control valve 100 detected by the second pressure detection member 420.

In addition, the controller 900 may estimate the amount of rotation of the swing motor 200 based on the pressure of the hydraulic oil flowing into the second valve 520 and the pressure of the hydraulic oil passing through the second valve 520, of the pressure of the hydraulic oil passing through the second hydraulic pressure line 320 discharged from the swing motor 200.

When the swing motor 200 is rotated in one direction, the third pressure detection member 430 detects the pressure of the hydraulic oil discharged from the swing motor 200 and flowing into the second valve 520 to transfer it to the controller 900. In addition, when the swing motor 200 is rotated in one direction, the second pressure detection member 420 detects the pressure of the hydraulic oil discharged from the swing motor 200 and discharged from the second valve 520 to transfer it to the controller 900.

In addition, the controller 900 may calculate the flow rate (Q) of the hydraulic oil passing through the second valve 520 using Equation 1 above. In this case, when it is determined that the swing motor 200 rotates in one direction, ΔP is the difference between the pressure of the hydraulic oil detected by the third pressure detection member 430 and the pressure of the hydraulic oil detected by the second pressure detection member 420.

In other words, the controller 900 may estimate the acceleration and deceleration of the swing motor 200 from the flow rate of the hydraulic oil passing through the second valve 520.

In the controller 900, acceleration and deceleration information of the swing motor 200 according to the flow rate of hydraulic oil passing through the valve is preset.

For example, in the controller 900, acceleration and deceleration data of the swing motor 200 according to the flow rate of hydraulic oil passing through the valves (510, 520) is stored in advance through experiments. Accordingly, the controller 900 may estimate the current acceleration and deceleration of the swing motor 200 by comparing the acceleration and deceleration data of the predetermined swing motor 200 based on the calculated flow rate of the hydraulic oil passing through the second valve 520.

Alternatively, the acceleration and deceleration data of the swing motor 200 stored in the controller 900 may be a value predetermined as the specification of the construction machinery 101.

The controller 900 opens the second valve 520 when the amount of rotation of the swing motor 200 is determined as swing deceleration of the swing motor 200.

In this case, the hydraulic oil discharged from the swing motor 200 may be input to the second valve 520 and then moved to the converging line 630 through the second detour line 620. In other words, the hydraulic oil discharged from the swing motor 200 input to the second valve 520 may detour the second hydraulic pressure line 320 between the second valve 520 and the main control valve 100 to be moved through the second detour line 620.

In addition, the controller 900 may be stored in the first accumulator 810 and the second accumulator 820 as the first pressure control valve 730 and the second pressure control valve 720 are opened. The hydraulic oil stored in such the first accumulator 810 may assist the torque of the engine by the regenerative motor 830.

In addition, the hydraulic oil discharged from the swing motor 200 upon acceleration of the swing motor 200 may be stored in the second accumulator 820. Specifically, in the second accumulator 820, the maximum pressure may be set relatively lower than that of the first accumulator 810. In addition, when the pressure of the hydraulic oil discharged from the swing motor 200 is lower than the pressure of the hydraulic oil pre-charged in the first accumulator 810, the hydraulic oil discharged from the swing motor 200 may be set to be stored in the second accumulator 820. In addition, since the pressure of the hydraulic oil pre-charged in the first accumulator 810 is set higher than the pressure of the hydraulic oil discharged from the swing motor 200 upon the acceleration of the swing motor 200, the hydraulic oil discharged from the swing motor 200 at the time of acceleration of the swing motor 200 may be stored in the second accumulator 820.

Figure 4:
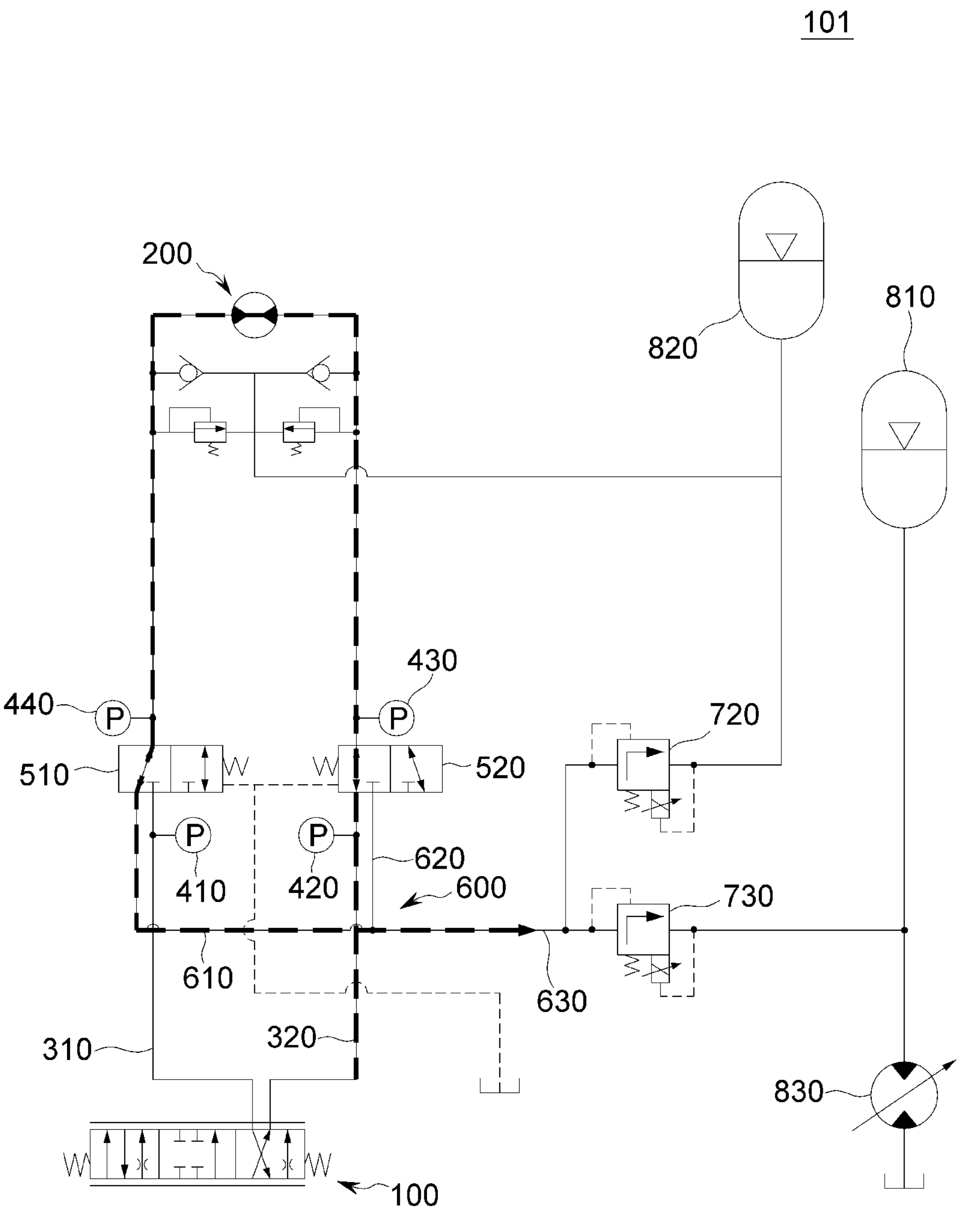

As an example, as shown in FIG. 4, a case in which the main control valve 100 is switched to allow the swing motor 200 to be rotated in the other direction (left turn) according to the manipulation information of the joystick is described.

The hydraulic oil in which pressure is generated from the main pump not shown is supplied to the second hydraulic pressure line 320 through a switching area of the main control valve 100.

In addition, the hydraulic oil passes through the second valve 520 to be supplied to the swing motor 200. Such the hydraulic oil is used for the rotation of the swing motor 200, and the swing body is rotated according to the rotation of the swing motor 200.

The hydraulic oil discharged from the swing motor 200 is moved along the first hydraulic pressure line 310.

The hydraulic oil then passes through the first valve 510 and flows back into the main control valve 100. Accordingly, the hydraulic oil passing through the main control valve 100 again may be discharged back into the tank not shown.

In this case, the controller 900 receives information detected by the first pressure detection member 410, the second pressure detection member 420, the third pressure detection member 430, and the fourth pressure detection member 440.

The controller 900 determines whether the pressure detected by the second pressure detection member 420 is greater than or equal to 30 bar, which is the predetermined rotational pressure. In other words, the second pressure detection member 420 detects the pressure of the hydraulic oil discharged from the main control valve 100 supplied to the swing motor 200 to transfer it to the controller 900.

In addition, the controller 900 compares the pressure of the hydraulic oil detected by the first pressure detection member 410 with the pressure of the hydraulic oil detected by the second pressure detection member 420. In other words, the first pressure detection member 410 detects the pressure of the hydraulic oil discharged from the swing motor 200 and flowing back into the main control valve 100 to transfer it to the controller 900.

Specifically, the controller 900 determines that the swing motor 200 rotates in the other direction when the pressure detected by the second pressure detection member 420 is greater than or equal to 30 bar, and the pressure of the hydraulic oil supplied to the swing motor 200 from the main control valve 100 detected by the second pressure detection member 420 is greater than the pressure of the hydraulic oil detected by the first pressure detection member 410 and discharged from the swing motor 200 and flowing into the main control valve 100.

Since the hydraulic oil flowing into the swing motor 200 from the main control valve 100 has higher pressure than that of the hydraulic oil discharged from the swing motor 200, the controller 900 determines that the rotation is performed in the other direction of the swing motor 200 when the pressure of the hydraulic oil detected by the second pressure detection member 420 is higher than that of the first pressure detection member 410 and the pressure detected by the second pressure detection member is greater than or equal to 30 bar.

In addition, the controller 900 may estimate the amount of rotation of the swing motor 200 based on the pressure of the hydraulic oil flowing into the first valve 510 and the pressure of the hydraulic oil passing through the first valve 510, of the pressure of the hydraulic oil passing through the first hydraulic pressure line 310 discharged from the swing motor 200.

When the swing motor 200 is rotated in the other direction, the second pressure detection member 420 detects the pressure of the hydraulic oil discharged from the swing motor 200 and flowing into the first valve 510 to transfer it to the controller 900. In addition, when the swing motor 200 is rotated in the other direction, the first pressure detection member 410 detects the pressure of the hydraulic oil discharged from the swing motor 200 and discharged from the first valve 510 to transfer it to the controller 900.

In addition, the controller 900 may calculate the flow rate Q of the hydraulic oil passing through the first valve 510 using Equation 1 above. Here, when it is determined that the swing motor 200 rotates in the other direction, ΔP is the difference between the pressure of the hydraulic oil detected by the fourth pressure detection member 440 and the pressure of the hydraulic oil detected by the first pressure detection member 410.

In other words, the controller 900 may estimate the acceleration and deceleration of the swing motor 200 from the flow rate of the hydraulic oil passing through the first valve 510.

The controller 900 opens the first valve 510 when the amount of rotation of the swing motor 200 is determined as the swing deceleration of the swing motor 200.

In this case, the hydraulic oil discharged from the swing motor 200 may be input to the first valve 510 and then moved to the converging line 630 through the first detour line 610. In other words, the hydraulic oil discharged from the swing motor 200 input to the first valve 510 may detour the first hydraulic pressure line 310 between the first valve 510 and the main control valve 100 to be moved through the first detour line 610. In other words, the first valve 510 is controlled by the controller 900 and may allow the hydraulic oil discharged from the swing motor 200 to be moved through the first detour line 610.

In addition, the controller 900 may be stored in the first accumulator 810 and the second accumulator 820 as the first pressure control valve 730 and the second pressure control valve 720 are opened. The hydraulic oil stored in the first accumulator 810 may assist the torque of the engine by the regenerative motor 830.

In addition, the hydraulic oil stored in the second accumulator 820 may be supplied in an inflow direction of the hydraulic oil of the swing motor 200 upon the rapid deceleration of the swing motor 200, such that it is possible to reduce generation of cavitation occurring due to the insufficiently supplied flow rate of the hydraulic oil to an inflow side of the swing motor 200 upon the rapid deceleration of the swing motor 200.

In other words, when the amount of rotation of the swing motor 200 decreases according to the swing deceleration of the swing motor 200, the construction machinery 101 may recover energy by storing the hydraulic oil discharged from the swing motor 200 in the first accumulator 810 or the second accumulator 820. In addition, the construction machinery 101 may utilize such the recovered energy as needed.

In addition, in the second accumulator 820, the hydraulic oil discharged from the swing motor 200 upon acceleration of the swing motor 200 may be stored.

As such, the construction machinery 101 according to an embodiment of the present disclosure may determine on the basis of the pressure flowing and discharged to and from the swing motor 200, without having a separate sensor to detect the rotational direction of the swing motor 200 and the amount of rotation thereof. Accordingly, the cost due to the maintenance of the construction machinery 101 and the manufacturing cost of the construction machinery 101 may be reduced.

Although embodiments of the present disclosure have been described with reference to the accompanying drawings, those skilled in the art to which the present disclosure pertains will understand that the present disclosure may be embodied in other specific forms without changing technical ideas or essential features thereof.

Therefore, the embodiments described above should be understood as exemplary in all respects and not limiting, and the scope of the present disclosure is presented by the detail description and the appended claims, while the meaning and scope of the claims and any alteration or modified form derived from the equivalent concept thereof should be construed as being included in the scope of the present disclosure.

INDUSTRIAL APPLICABILITY

Embodiments of the present disclosure relate to construction machinery capable of estimating a rotational direction of a swing motor and an amount of rotation thereof without a separate sensor.

DETAILED DESCRIPTION OF MAIN ELEMENTS

100: Main control valve 101: Construction machinery
200: Swing motor 310: First hydraulic pressure line
320: Second hydraulic pressure line 410: First pressure detection member
420: Second pressure detection member 430: Third pressure detection member
440: Fourth pressure detection member 510: First valve
520: Second valve 600: Third hydraulic pressure line
900: Controller A: Spool area of first valve or second valve

The invention claimed is:

1. Construction machinery comprising:
- a main control valve which is configured to receive and transfer a hydraulic oil;
- a swing motor which is configured to be operated by the hydraulic oil transferred from the main control valve;
- a first hydraulic pressure line connected to the main control valve and one side of the swing motor;
- a first valve arranged on the first hydraulic pressure line;
- a first pressure detection member which is configured to detect pressure of the hydraulic oil passing through the first hydraulic pressure line between the first valve and the main control valve;
- a fourth pressure detection member which is configured to detect pressure of the hydraulic oil passing through the first hydraulic pressure line between the swing motor and the first valve;
- a third hydraulic pressure line which is connected to the first valve and is configured to guide the hydraulic oil passing through the first hydraulic pressure line to be moved by detouring the first hydraulic pressure line;
- an accumulator which stores the hydraulic oil passing through the third hydraulic pressure line; and
- a controller which is configured to
  - calculate a flow rate of the hydraulic oil discharged from the swing motor based on the pressure of the hydraulic oil detected by the first pressure detection member and the pressure of the hydraulic oil detected by the fourth pressure detection member, and selectively control the first valve to cause the hydraulic oil passing through the first valve to move to the first hydraulic pressure line or the third hydraulic pressure line.

2. The construction machinery of claim 1, wherein the controller is configured to estimate a rotational speed of the swing motor through the calculated flow rate of the hydraulic oil.

3. The construction machinery of claim 1, wherein the controller is configured to calculate the flow rate of the hydraulic oil based on the pressure of the hydraulic oil detected by the first pressure detection member and the pressure of the hydraulic oil detected by the fourth pressure detection member.

4. The construction machinery of claim 1, wherein the controller is configured to calculate the flow rate of the hydraulic oil when the hydraulic oil discharged from the swing motor is guided to detour the main control valve as the first valve is switched.

5. The construction machinery of claim 1, wherein the controller is configured to calculate the flow rate of the hydraulic oil based on a spool area of the first valve and a difference between the pressure of the hydraulic oil detected by the first pressure detection member and the pressure of the hydraulic oil detected by the fourth pressure detection member.

6. The construction machinery of claim 1, wherein the controller is configured to determine that the swing motor rotates in one direction when the pressure of the hydraulic oil detected by the first pressure detection member is greater than a predetermined rotational pressure.

7. The construction machinery of claim 6, further comprising:

a second hydraulic pressure line connected to the main control valve and the other side of the swing motor;

a second pressure detection member which is arranged on the second hydraulic pressure line and is configured to detect pressure of the hydraulic oil passing through the second hydraulic pressure line;

a second valve arranged on the second hydraulic pressure line between the second pressure detection member and the swing motor; and the third hydraulic pressure line which is connected to the first valve and the second valve and allows the hydraulic oil passing through the first hydraulic pressure line or the second hydraulic pressure line to detour.

8. The construction machinery of claim 7, further comprising:

a third pressure detection member which is arranged on the second hydraulic pressure line between the second valve and the swing motor and is configured to detect pressure of the hydraulic oil flowing into the second valve to transfer it to the controller.

9. Construction machinery comprising:

a main control valve which is configured to receive and transfer a hydraulic oil;

a swing motor configured to be operated by the hydraulic oil transferred from the main control valve;

a first hydraulic pressure line connected to the main control valve and one side of the swing motor;

a second hydraulic pressure line connected to the main control valve and the other side of the swing motor;

a first pressure detection member which is arranged on the first hydraulic pressure line and is configured to detect pressure of the hydraulic oil passing through the first hydraulic pressure line;

a first valve which is arranged on the first hydraulic pressure line between the first pressure detection member and the swing motor and is switchable to allow the hydraulic oil passing through the first hydraulic pressure line to detour;

a second pressure detection member which is arranged on the second hydraulic pressure line and is configured to detect pressure of the hydraulic oil passing through the second hydraulic pressure line;

a second valve which is arranged on the second hydraulic pressure line between the second pressure detection member and the swing motor and is switchable to allow the hydraulic oil passing through the first hydraulic pressure line to detour;

a third hydraulic pressure line which is connected to the first valve and the second valve and allows the hydraulic oil passing through the first hydraulic pressure line or the second hydraulic pressure line to detour;

an accumulator which stores the hydraulic oil passing through the third hydraulic pressure line;

a third pressure detection member which is arranged between the second valve and the swing motor and is configured to detect pressure of the hydraulic oil flowing into the second valve;

a fourth pressure detection member which is arranged between the first valve and the swing motor and is configured to detect pressure of the hydraulic oil flowing into the first valve; and a controller which is configured to calculate a flow rate discharged from the swing motor based on the pressure of the hydraulic oil discharged from the swing motor and flowing into the first valve or the second valve and pressure of the hydraulic oil discharged from the first valve or the second valve, based on information on the pressure of the hydraulic oil detected by the first pressure detection member and the pressure of the hydraulic oil detected by the second pressure detection member, and selectively control the first valve or the second valve to cause the hydraulic oil passing through the first valve or second valve to move to the third hydraulic pressure line.

* * * * *